(12) United States Patent
Ota et al.

(10) Patent No.: US 8,212,910 B2
(45) Date of Patent: Jul. 3, 2012

(54) INFORMATION PROCESSING APPARATUS AND CONTROL METHOD THEREOF

(75) Inventors: Tomohiro Ota, Kawasaki (JP); Soushi Takita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 357 days.

(21) Appl. No.: 12/646,017

(22) Filed: Dec. 23, 2009

(65) Prior Publication Data

US 2010/0171861 A1  Jul. 8, 2010

(30) Foreign Application Priority Data

Jan. 7, 2009  (JP) ................................ 2009-001730

(51) Int. Cl.
*H04N 5/225* (2006.01)
*G06F 3/048* (2006.01)

(52) U.S. Cl. .................... 348/333.02; 715/772
(58) Field of Classification Search ............ 715/772; 348/333.01, 333.02

See application file for complete search history.

(56) References Cited

U.S. PATENT DOCUMENTS

| | | | | |
|---|---|---|---|---|
| 7,304,664 B2* | 12/2007 | Kawade | ................ | 348/333.02 |
| 2003/0137541 A1* | 7/2003 | Massengale et al. | ......... | 345/764 |
| 2007/0220209 A1 | 9/2007 | Maeda | | |
| 2009/0291804 A1* | 11/2009 | Stearns et al. | .................... | 482/8 |
| 2010/0201845 A1* | 8/2010 | Feinberg et al. | ......... | 348/231.99 |

FOREIGN PATENT DOCUMENTS

| | | | |
|---|---|---|---|
| JP | 2005-124047 A | 5/2005 | |
| JP | 2007-122090 A | 5/2007 | |

* cited by examiner

*Primary Examiner* — Jason Whipkey
(74) *Attorney, Agent, or Firm* — Canon USA Inc. IP Division (57) ABSTRACT

An information processing apparatus includes a processing unit configured to execute a predetermined process, an acquisition unit configured to acquire a progress situation of the predetermined process executed by the processing unit, and a display control unit configured to display a progress situation display area for indicating the progress situation of the predetermined process on an area which lies along a plurality of adjacent sides of the display area on a display apparatus, and control a display state of the progress situation display area based on the progress situation acquired by the acquisition unit so that the display state changes from a state indicating that processing is yet to be performed to a state indicating that processing has been performed, progressively from one end to another end of the progress situation display area at a different rate based on a length of the sides along which the progress situation display area lies.

13 Claims, 10 Drawing Sheets

INFORMATION PROCESSING APPARATUS AND CONTROL METHOD THEREOF

BACKGROUND OF THE INVENTION

1. Field of the Invention

The present invention relates to an information processing apparatus which displays a progress situation of a certain process.

2. Description of the Related Art

Sometimes, a progress bar is displayed to indicate a progress situation of a certain process. For example, a common progress bar display indicates the progress situation by a ratio of an area filled with color in a horizontal or vertical rectangle (Japanese Patent Application Laid-Open No. 2007-122090).

Figure 10:
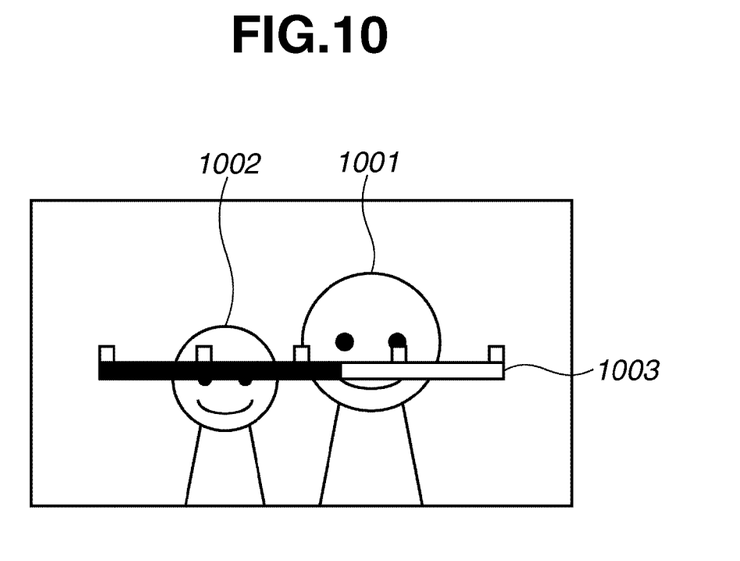
FIG. 10 illustrates a conventional progress bar display.

In FIG. 10, an example of a conventional progress bar display is illustrated. FIG. 10 illustrates a display screen which is provided on an imaging apparatus. In this display screen, a progress bar 1003 is superimposed over an image with subjects 1001 and 1002.

However, in the conventional progress bar display like that illustrated in FIG. 10, the progress bar 1003 superimposed over the image is displayed in a manner which hides the subjects 1001 and 1002 which are main portions of the image. Thus, in the imaging apparatus, depending on the imaging situation, the progress bar display can hinder an imaging action performed by a user. This is the same not only during an imaging process, but also when a recorded video is reproduced.

Further, no matter how long the progress bar is, the conventional progress bar can only be displayed in an area which is used up to the full length of a side on either the horizontal or vertical direction. However, in such a conventional progress bar, if the display screen is itself small, a variation range in the bar display for indicating the progress situation decreases, and it is difficult for a user to view. Therefore, to indicate the progress situation more clearly, or to indicate the ratio of progress in more detail, the conventional progress bar display is not sufficient.

SUMMARY OF THE INVENTION

The present invention is directed to an information processing apparatus capable of displaying a progress situation which can be discerned more easily by a user than the conventional progress bar display, even for a small display screen.

According to an aspect of the present invention, an information processing apparatus includes a processing unit configured to execute a predetermined process, an acquisition unit configured to acquire a progress situation of the predetermined process executed by the processing unit, and a display control unit configured to display a progress situation display area for indicating the progress situation of the predetermined process on an area which lies along a plurality of adjacent sides of the display area on a display apparatus, and control a display state of the progress situation display area based on the progress situation acquired by the acquisition unit so that the display state changes from a state indicating that processing is yet to be performed to a state indicating that processing has been performed, progressively from one end to another end of the progress situation display area at a different rate based on a length of the sides along which the progress situation display area lies.

According to the present invention, a progress situation can be displayed which does not hide main display elements in a screen, and which is more easily discerned by a user than a conventional progress bar display, even for a small display screen.

This summary of the invention does not necessarily describe all necessary features so that the invention may also be a sub-combination of these described features.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A digital video camera will be described as an example of an information processing apparatus according to the present invention. The video camera has, as a moving image capture mode, a mode in which moving image capturing operation is performed for four seconds fixed. More specifically, this video camera has a "snap mode", in which image capture is automatically finished four seconds after starting to capture the moving image.

Figure 1:
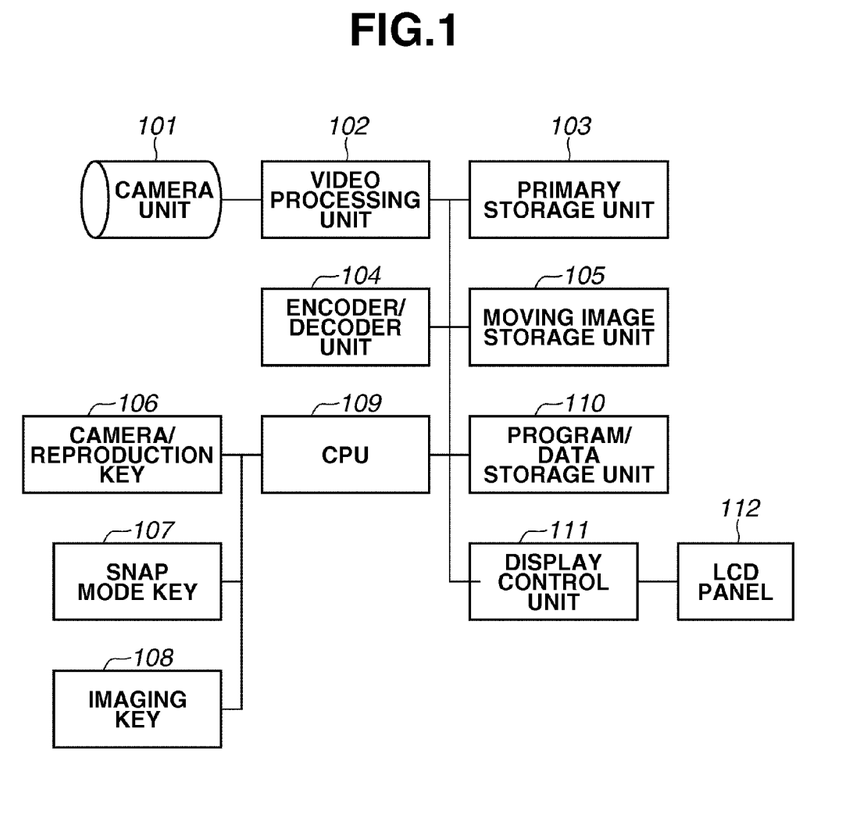
FIG. 1 is a block diagram of an imaging apparatus according to an exemplary embodiment of the present invention.

FIG. 1 is a block diagram illustrating a data path in the video camera.

A central processing unit (CPU) 109 is an arithmetic device which reads a program from a program/data storage unit 110, and controls the overall operation of the video camera based on the read program. The read program includes a function for controlling the CPU 109 to execute a plurality of tasks in parallel. In the CPU 109, the read program operates a mode control task, a camera control task, a recorder control task, and a display control task. A part of a primary storage unit (temporary memory) 103 functions as a work area of the CPU 109.

An analog video signal is input from a camera unit 101. The camera unit 101 includes a lens for forming light from a subject into an image, an image sensor for photoelectrically converting the subject image formed by the lens, and a circuit for driving the image sensor. A video processing unit 102 converts and suitably corrects the analog video signal into digital moving image data. Operations of the camera unit 101 and the video processing unit 102 are controlled by the camera control task.

The moving image data from the video processing unit 102 is encoded by an encoder/decoder unit 104. The moving image data encoded by the encoder/decoder unit 104 is temporarily stored in the primary storage unit 103, and then stored in a moving image storage unit 105 together with accompanying management data. Conversely, during reproduction of the moving image, the encoded moving image data read from the moving image storage unit 105 is decoded by the encoder/decoder unit 104 via the primary storage unit 103, and rasterized in a moving image frame buffer in the primary storage unit 103 again. The encoder/decoder unit 104 and the moving image storage unit 105 are controlled by the recorder control task.

The management data read from the moving image storage unit 105 is utilized in generation of an operational sequence diagram (OSD) (a character display or graphical user interface (GUI) superimposed over the captured image or the reproduced image). The management data is rendered in an OSD frame buffer in the primary storage unit 103. Contents of the moving image frame buffer and the OSD frame buffer are superimposed by a display control unit 111 and displayed on a liquid crystal display (LCD) panel 112. OSD control and control of the display control unit 111 and the LCD panel 112 are performed by the display control task.

A camera/reproduction key 106, a snap mode key 107, and an imaging key 108 are all operation units for receiving an operation instruction from the user. The mode control task shifts an operation state of the whole apparatus based on an instruction from this group of keys, a request from another task, or a change in an internal state managed by the mode control task itself. The mode control task also notifies each task of such events.

Figure 2:
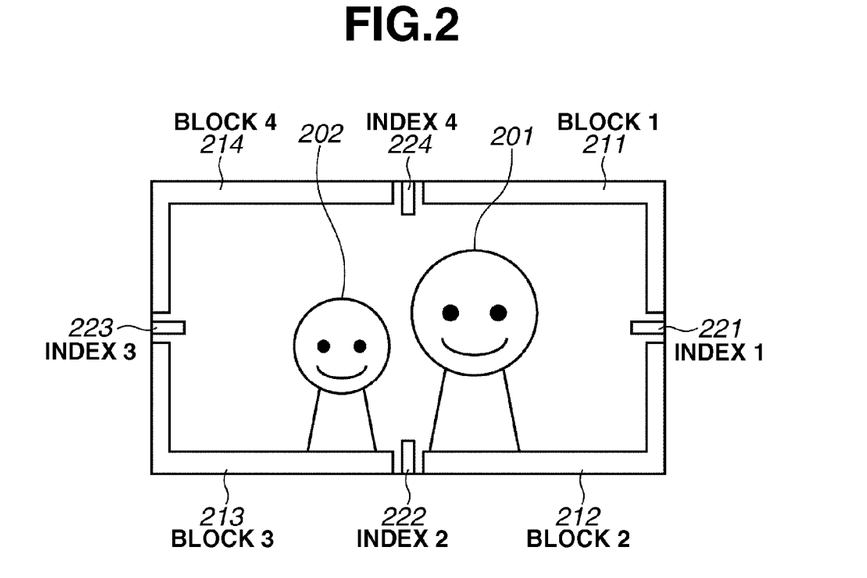
FIG. 2 illustrates a configuration of a display screen according to the exemplary embodiment of the present invention.

Next, FIG. 2 will be described. FIG. 2 is a schematic diagram of a screen displayed on the LCD panel 112 in an imaging standby state during the snap mode.

The entire image captured by the camera unit 101 is displayed in a full screen of the LCD panel 112, and a subject 201 and a subject 202 are included.

On the periphery of the screen, corner bracket shaped objects 211, 212, 213, and 214 (progress situation display area) are displayed by the OSD along each side of the screen. In the following description, for convenience these objects are referred to as "blocks 1 to 4".

Further, rectangular objects 221, 222, 223, and 224 are displayed by the OSD between each of the block displays. In the following description, for convenience these objects are referred to as "indices 1 to 4".

Imaging time in the snap mode is four seconds. Therefore, the progress situation display area is divided into four blocks, and separated by four indices. Each of the blocks can be considered as a shape formed by segmenting a large rectangular frame display enclosing the whole screen by each of the indices. However, it is not necessary for each of these blocks and indices to be an independent shape. These blocks and indices may together form an integrated shape. While the indices are placed at a position indicating a midpoint of each side of the screen, the indices do not have to be at such a position. Further, the number of indices does not have to be four, and the number may even be zero. However, as illustrated in FIG. 2, by placing the indices at four positions indicating the midpoint of each side of the screen, several desirable effects can be obtained. These effects will be described below.

FIGS. 3A to 3D are schematic diagrams illustrating a transition of a screen displayed on the LCD panel 112 in which one scene in the snap mode is displayed from an imaging standby state and start to finish of an imaging process.

Figure 3A:
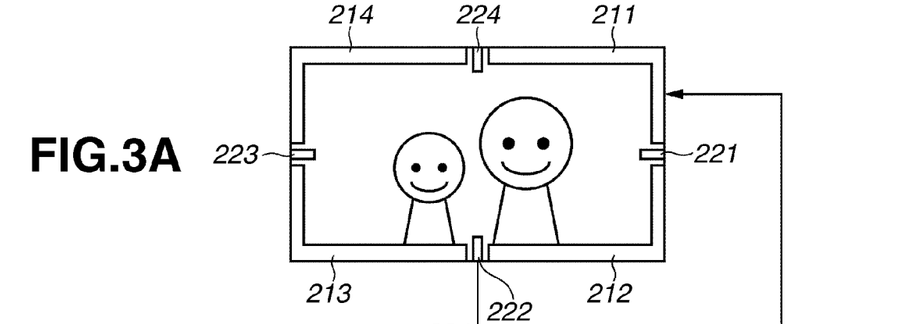
FIGS. 3A to 3D illustrate a transition of the display screen according to the exemplary embodiment of the present invention.

FIG. 3A illustrates the imaging standby state, and is the same as the state of FIG. 2. In this state, the blocks 1 to 4 are in a display state indicating that processing is yet to be performed. When in a normal imaging mode, rather than in the snap mode, the captured image is displayed on the whole screen of the LCD panel 112, without the blocks 1 to 4 and indices 1 to 4 being displayed. When the normal imaging mode is switched to the snap mode, the blocks 1 to 4 and the indices 1 to 4 are displayed by being superimposed over the captured image. This is the state illustrated in FIG. 3A.

Figure 3B:
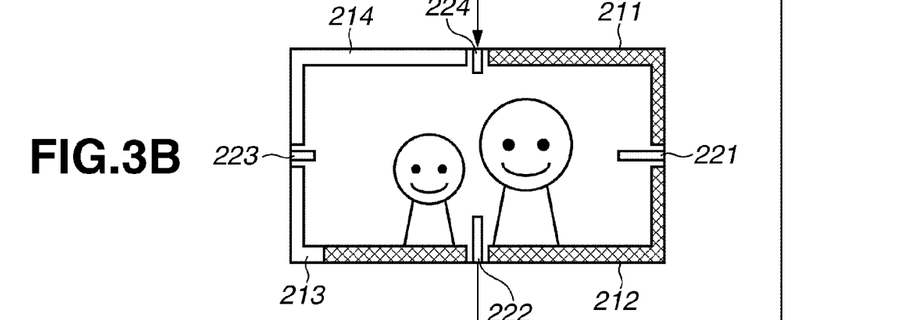

FIG. 3B illustrates a situation in which the color of each block during an imaging process gradually changes from a color indicating that processing is yet to be performed to a color indicating that processing has been performed, from one end to another based on the elapsed time since the start of the imaging process. During the first 0.5 seconds, a horizontal rectangular portion of the block 1 gradually changes from the left. After 0.5 seconds have elapsed, the color of the whole horizontal rectangular portion has changed. During the next 0.5 seconds, the color of the vertical rectangular portion of the block 1 similarly progressively changes from the top. After 1 second has elapsed from the start of the imaging process, the color of the whole block 1 has changed. At this point, a length of the index 1 also changes. Similarly, the color of the block 2 changes from between 1 second and 2 seconds, the color of the block 3 changes from between 2 seconds and 3 seconds, and the color of the block 4 changes from between 3 seconds and 4 seconds. Consequently, the lengths of the indices 2, 3, and 4 respectively change at the timing of the separations at 2 seconds, 3 seconds, and 4 seconds.

If the color of the blocks changes in this way, when a color change point (a boundary between the color indicating that processing is yet to be performed and the color indicating that processing has been performed) of the blocks progresses through any of the vertical or horizontal sides of the screen, this means that one second has elapsed. Moreover, when the color change point of the blocks progresses through an interval between indices, this also means that one second has elapsed. Therefore, from a user's perspective, each of the apexes can be viewed as a 0.5 second scale, and the progress situation can be directly indicated in an easy to understand manner.

According to the above described display method, if some of the sides have different lengths, such as for a non-regular rectangle, the rate at which the color of the block changes is not fixed (not the same rate), and is different depending on the side. However, since one side indicates progress of ¼ of the total, it is easier for the user to view the elapsed time. If the block color change point moves so that progress is made over an equal distance for a fixed time regardless of the aspect ratio of the screen, the time during which progress is made over the vertical side and the time during which progress is made over the horizontal side would no longer be equal. Consequently, the change in color of one side does not indicate ¼ progress, so that the visibility is not good for the user.

In a case where the vertical length and the horizontal length of the screen are different, if one side is set to indicate one second, the difference among the respective sides in the rate with which the change in the color of the blocks progresses becomes too large and may seem strange to a user. In such a case, the rate with which the change in the color of the blocks progresses may be set at a fixed rate (equal rate), and one side set so that it does not indicate ¼ of the progress situation.

The change in the display state of each of the blocks and each of the indices may be indicated by any of color, shape, or a combination of the color and the shape. Further, each of the indices may be a display in which an animation starts before separation timing is reached or when the separation timing is reached.

Figure 3C:
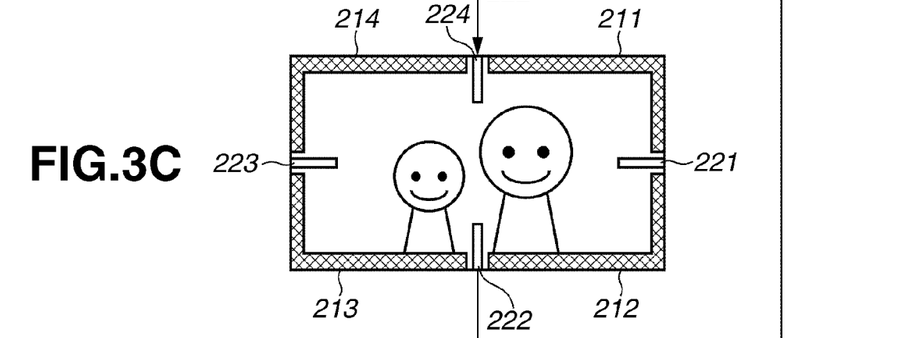

FIG. 3C illustrates the screen just at the point where four seconds have elapsed. In FIG. 3C, all of the blocks and indices are in a state of after the display state has changed (display state indicating that processing has been performed). At this point, the imaging process automatically finishes.

Figure 3D:
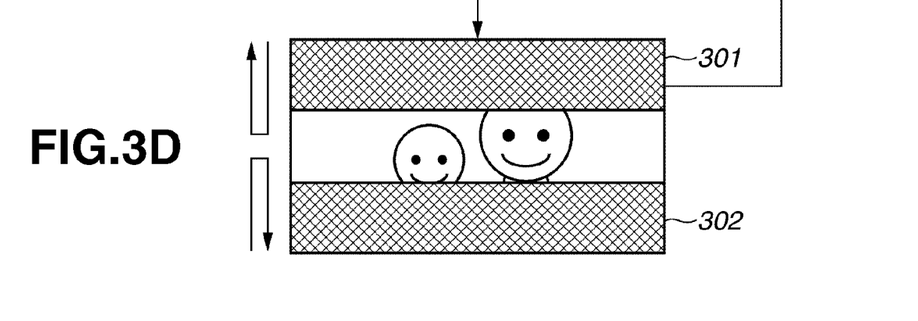

When the imaging process in the snap mode is finished, a shutter mask animation is displayed by the OSD. FIG. 3D illustrates this state. In the shutter mask animation, rectangular displays 301 and 302, which have a size fully across the horizontal width of the screen, gradually spread from the top and the bottom of the screen. After the rectangular displays 301 and 302 touch in the middle of the screen, they then gradually return to the top and bottom of the screen. Finally, the rectangular displays 301 and 302 disappear.

When the shutter mask animation finishes, the screen returns to the original imaging standby state of FIG. 3A.

In the above, screen transitions in the snap mode are described. The changes in the display state from FIG. 3A to FIG. 3C provide at least two effects.

The first effect is due to the fact that the display indicating the progress situation is performed only at the periphery of the screen. During imaging by the video camera, except for some intentional cases, the main subject is usually framed so as to fit inside the periphery of the screen. Therefore, it can be expected that the display indicating the progress situation in the periphery of the screen can avoid hiding the main subject and disturbing the imaging process.

The second effect is that the user can directly and clearly recognize currently how far the imaging process has progressed in the four second imaging period. This is because the period during which the color change point travels once around the screen periphery can be considered as being uniformly divided by a total of eight locations, the four apexes and the four indices on the sides of the screen. In other words, visibility can be improved by utilizing the apexes of the screen as a scale indicating the passage of time. Further, based on figurative characteristics of the frame display formed from the four blocks, it can easily be understood that at the point where the color on the right-hand half has changed, ½ of the whole, namely two seconds, has elapsed. Similarly, ¼ and ¾ of the whole can also be easily figuratively recognized.

Further, the conventional progress bar display illustrated in FIG. 10 cannot indicate the progress situation for a distance longer than one side of the screen. However, in the present exemplary embodiment, the progress situation can be indicated by the sum of the lengths of the four sides of the screen. Thus the progress situation can be viewed in a more detailed ratio.

In addition to the effects of FIGS. 3A to 3C, due to the shutter mask animation of FIG. 3D, the user can clearly recognize that the imaging process has finished in four seconds.

Figure 4:
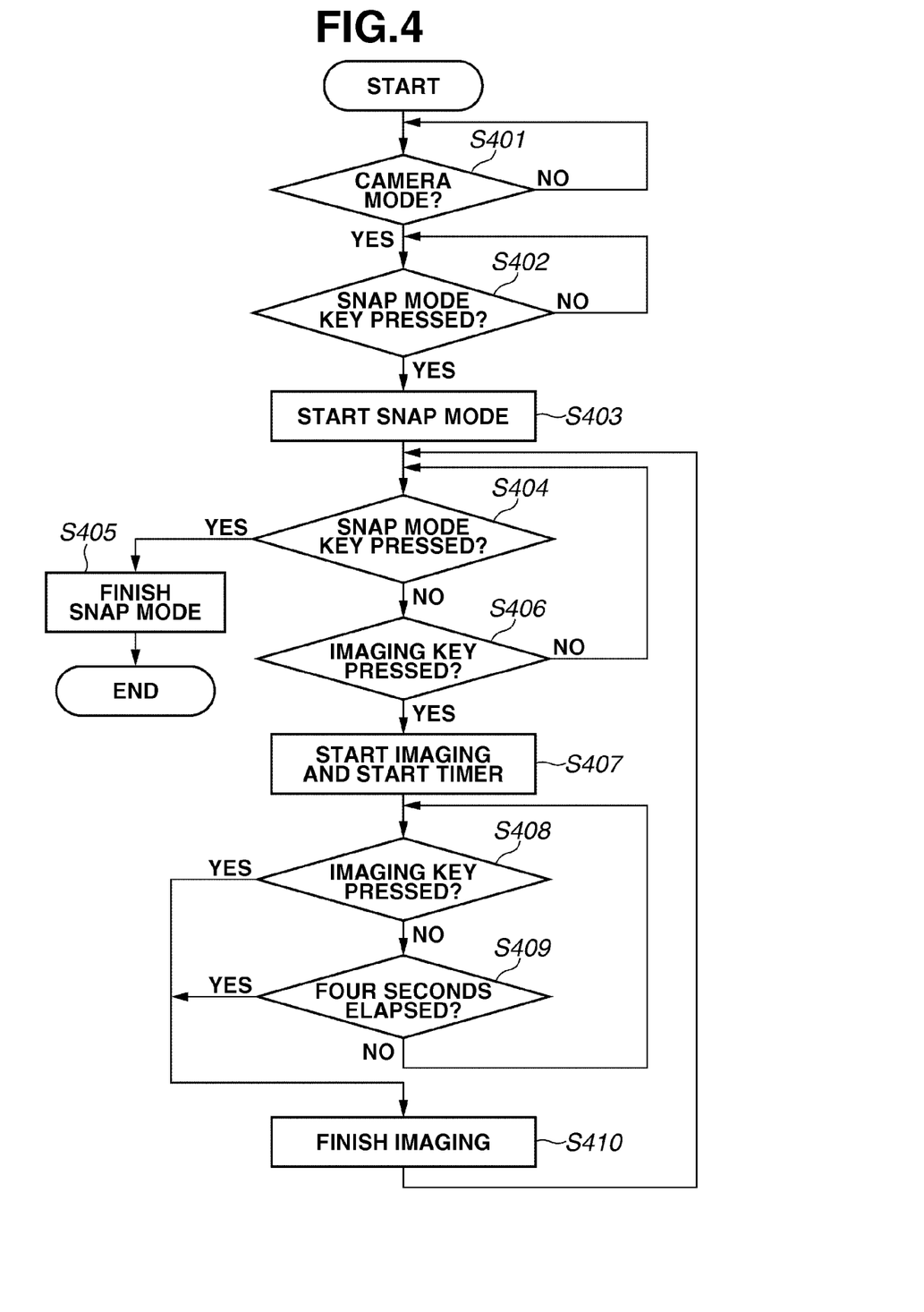
FIG. 4 is a flowchart illustrating a mode control of the imaging apparatus according to the exemplary embodiment of the present invention.
Figure 5:
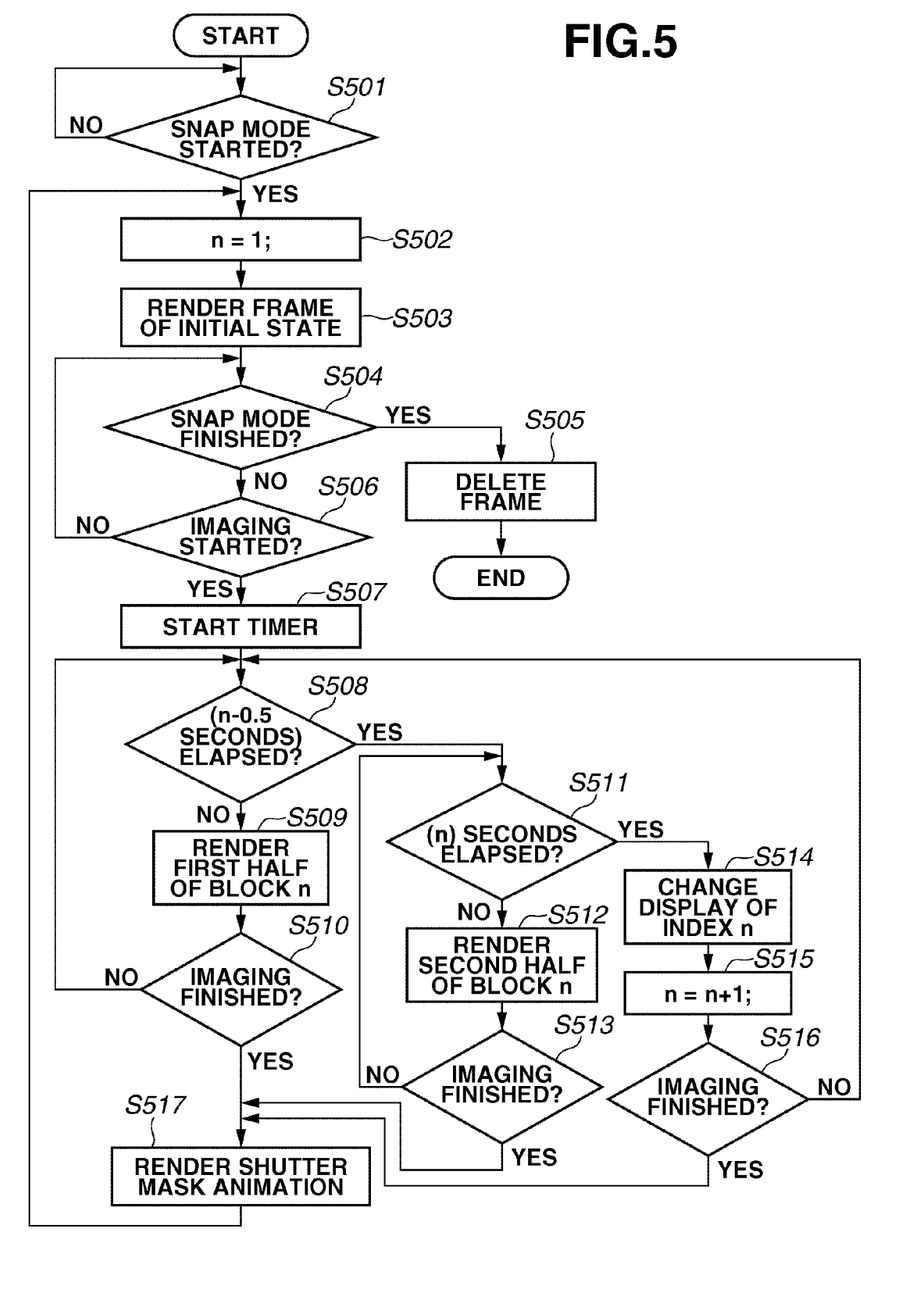
FIG. 5 is a flowchart illustrating a display control of the imaging apparatus according to the exemplary embodiment of the present invention.

FIGS. 4 and 5 are flowcharts illustrating operations of the mode control task and the display control task executed by the CPU 109 in the present exemplary embodiment. FIG. 4 illustrates the operations of the mode control task, and FIG. 5 illustrates the operations of the display control task. Both of these tasks are realized by the CPU 109 reading and executing a program from the program/data storage unit 110.

First, the processing of the mode control task illustrated in FIG. 4 will be described.

In step S401, it is determined whether the video camera is set to a camera mode (imaging mode). Since the snap mode is a function performed during the imaging process, the following processing is only performed during the camera mode. Switching between the camera mode and the reproduction mode is performed by pressing the camera/reproduction key 106. At this point, the other tasks are notified of the mode transition.

In step S402, it is determined whether the snap mode key 107 is pressed. If it is determined that the snap mode key 107 is pressed in the camera mode (YES in step S402), in step S403, the snap mode is started. The starting of the snap mode is notified to the other tasks.

In step S404, it is determined whether the snap mode key 107 is again pressed. If it is determined that the snap mode key 107 is pressed (YES in step S404), in step S405, the snap mode is finished, and the finishing of the snap mode is notified to the other tasks. The series of processes in the flowchart is then finished here.

On the other hand, if it is determined in step S404 that the snap mode key 107 is not pressed (NO in step S404), in step S406, it is determined whether the imaging key is pressed. If it is determined that the imaging key is pressed (YES in step S406), in step S407, the imaging process is started, and the starting of the imaging process is notified to the other tasks. During the imaging process, the image being captured is controlled to be displayed on the LCD panel 112 (third display control unit). Further, in step S407, a timer (time measurement unit) for measuring the four seconds of the snap mode imaging period is also started.

In step S408, it is determined whether the imaging key is again pressed. If it is determined that the imaging key is not pressed (NO in step S408), in step S409, it is determined whether four seconds have elapsed since the imaging process started. If it is determined that the imaging key is pressed before four seconds elapsed after the imaging process started (YES in step S408), or that four seconds have elapsed since the imaging process started (YES in step S409), the processing proceeds to step S410. In step S410, the imaging process is finished, and the finishing of the imaging process is notified to the other tasks. Then, the processing returns to the state of step S404.

Next, the processing of the display control task illustrated in FIG. 5 will be described.

In step S501, it is determined whether the snap mode start is notified from the mode control task. If it is determined that the snap mode has started (YES in step S501), in step S502, a state management variable n is initialized as n=1. Then, in step S503, a frame of an initial state is rendered (first display control unit). The display screen of the LCD panel 112 at this stage is in the state illustrated in FIG. 3A.

In step S504, it is determined whether the finishing of the snap mode is notified from the mode control task. If it is determined that the snap mode has finished (YES in step S504), in step S505, the frame is deleted, and the series of processes in the flowchart is finished.

In step S504, if the finishing of the snap mode has not been notified (NO in step S504), in step S506, it is determined whether the imaging process start is notified from the mode control task. If the imaging process has started (YES in step S506), in step S507, the timer for measuring the four seconds of the snap mode imaging period is started.

In step S508, a measurement value (timer value) of the timer is acquired, and it is determined whether the timer value indicates that (n−0.5) seconds has elapsed. If it is determined that (n−0.5) seconds has not elapsed (NO in step S508), in step S509, a first half portion of a block n is rendered based on the timer value, and the color is changed (second display control unit). For example, if n=1, the horizontal rectangular portion of the block 1 is rendered. During zero to 0.5 seconds, the color is changed at a rate so that the rendering of the horizontal rectangular portion of the block 1 is just completed. In step S510, it is determined whether finishing of the imaging process is notified from the mode control task. If it is determined that the imaging process has not finished (NO in step S510), the processing returns to step S508.

If it is determined in step S508 that (n−0.5) seconds has elapsed (YES in step S508), the processing proceeds to step S511. In step S511, the measurement value (timer value) of the timer is acquired, and it is determined whether the timer value indicates that (n) seconds has elapsed. If it is determined that (n) seconds has not elapsed (NO in step S511), in step S512, a second half portion of the block n is rendered based on the timer value, and the color is changed (second display control unit). For example, if n=1, the vertical rectangular portion of the block 1 is rendered. During 0.5 to 1 second, the color is changed at a rate so that the rendering of the vertical rectangular portion of the block 1 is just completed. Since the vertical rectangular portion of the block 1 is shorter than the horizontal rectangular portion of the block 1, the rate of change in the vertical rectangular portion is controlled to be slower than the rate when the color of the horizontal rectangular portion is changed. In step S513, it is determined whether the finishing of the imaging process is notified from the mode control task. If it is determined that the imaging process has not finished (NO in step S513), the processing returns to step S511.

If it is determined that (n) seconds has elapsed (YES in step S511), in step S514, the display of index n is changed. Then, in step S515, the state management variable n is added. In step S516, it is determined whether the finishing of the imaging process is notified from the mode control task. If it is determined that the imaging process has not finished (NO in step S516), the processing returns to step S508.

If it is determined in any of steps S510, S513, and S516 that the finishing of the imaging process is notified (YES in step S510, S513, and S516), in step S517, the shutter mask animation is rendered, and the processing returns to step S502. If the imaging process is to be finished after four seconds have elapsed from the start of the imaging process, this means that a path is followed in which the processing moves on to step S517 only after changing the display of all of the blocks and the indices up to step S516.

Figure 6:
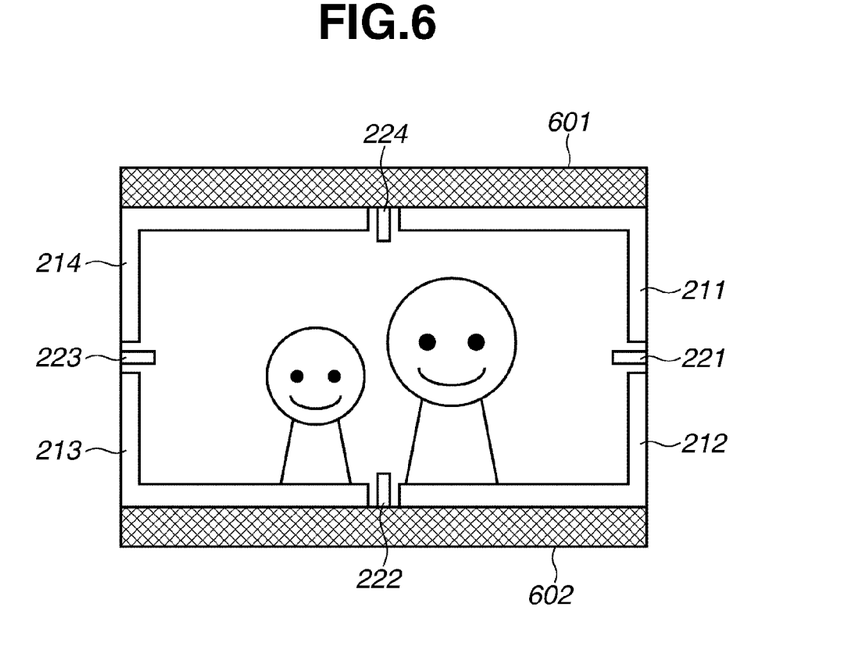
FIG. 6 illustrates the display screen according to the exemplary embodiment of the present invention.

In the above exemplary embodiment, an example is described in which an effective display area is equal to the whole screen. However, if a non-effective area is present in the screen, like for a letter box (non-display area which appears vertically or horizontally in the screen when the aspect ratio is different between the image data and the display apparatus), the effective display area may be defined more narrowly than the screen. The term "screen" as used here refers to the whole display screen of the LCD panel 112. An example of a screen with letter boxes is illustrated in FIG. 6. In FIG. 6, blocks 211, 212, 213, and 214 and indices 221, 222, 223, and 224 are displayed on the inner side of letter boxes 601 and 602.

Figure 7:
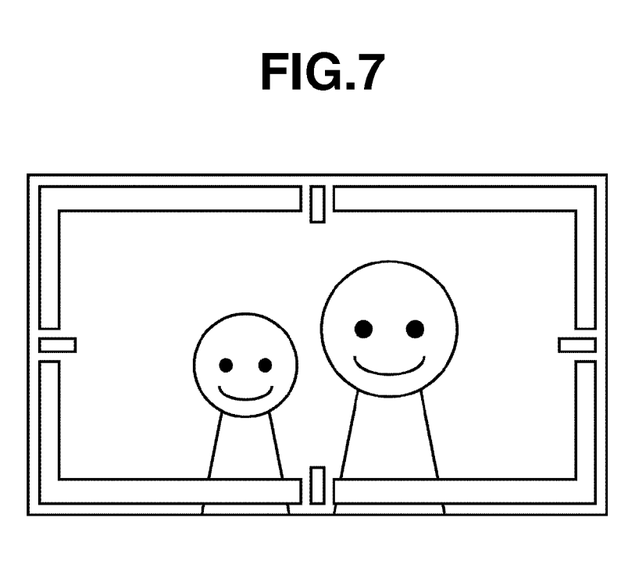
FIG. 7 illustrates the display screen according to the exemplary embodiment of the present invention.

Further, as illustrated in FIG. 2, it is desirable for each of the blocks and the indices to touch a side of the effective display area. However, as long as effects similar to the present exemplary embodiment can be obtained, the blocks and the indices may be separated from the sides of the effective display area, as illustrated in FIG. 7.

Further, if an apparatus including the display system according to the present invention includes a window system, the effective display area according to the present invention can be considered as the whole screen managed by the window system. Further, the effective display area can also be considered as an area in a single window.

In the above exemplary embodiment, an example is described in which the present invention is applied in a display of a progress situation of snap mode processing, which is a mode in which imaging processing of a moving image is performed for a fixed four seconds. However, the present invention is not limited to the above example.

For example, the present application is not limited to four seconds. The present application may be applied in a display of a progress situation of imaging processing in a mode in which a moving image can be captured for a predetermined duration. In such a case, the change in the display state is controlled so that the fact that the processing has progressed ¼ of the predetermined duration is displayed each time the change in the display state progresses through a block which lies along one side of a rectangle.

The present invention may be applied not only in a rectangular effective display area, but also in a polygonal effective display area. In such a case, for example, blocks are displayed along n sides of the polygonal effective display area. Each time the change in the display state progresses through a block lying along one side, the change in the display state is controlled so that the fact that the processing has progressed 1/n of the predetermined duration (time required for the whole processing) is displayed.

Figure 8:
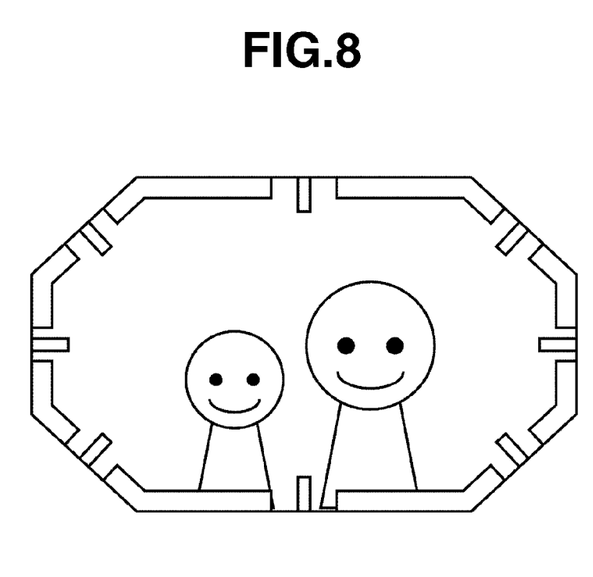
FIG. 8 illustrates the display screen according to the exemplary embodiment of the present invention.

For example, FIG. 8 illustrates an example in which the present invention is applied to an octahedral effective display area. In the example illustrated in FIG. 8, blocks are displayed along all eight sides of the octahedral effective display area. The rate of change in the display state is controlled based on the length of the sides such that a block lying along one side indicates ⅛ of the processing.

Further, in the above exemplary embodiment, the progress situation is displayed using blocks lying along all of the sides of the effective display area. However, the present invention is not limited to this. The effects of the present invention can be expected as long as the progress situation is displayed using blocks lying along a plurality of sides, with two or more of these sides adjacent to each other. Here, "two or more sides adjacent to each other" means a plurality of sides which are continuous and connected at the same apex.

For example, in FIG. 2, the blocks lying along only the top side and the right side connected at the top right apex could be used, without displaying the horizontal rectangular portion of the block 2, the whole of the block 3, and the vertical rectangular portion of the block 4. When processing is started, the display state progressively changes not from block 1, but from the left edge of the horizontal rectangular portion of the block 4, then across the horizontal rectangular portion of the block 1, the vertical rectangular portion of the block 1, and the vertical rectangular portion of the block 2. The processing is controlled so that the change in the display state of the vertical rectangular portion of the block 2 is completed along with completion of the processing. In such a case, since two sides are used, the display state of both the horizontal rectangular portion of the block 4 and the horizontal rectangular portion of the block 1, which are the blocks lying along the top side, is controlled to indicate that processing has been performed based on ½ of the processing having progressed. According to this method, the middle of the effective display area where the main display elements tend to be placed can be avoided.

Further, compared with the conventional progress bar display, the progress situation can be indicated more clearly and in greater detail using a longer area with the blocks and indices lying along the plurality of sides. Moreover, since the fact that 1/n of the processing has progressed is indicated by one side, the apex can be considered as a scale of the progress of the processing. Therefore the progress situation of the processing can be indicated more directly.

Figure 9:
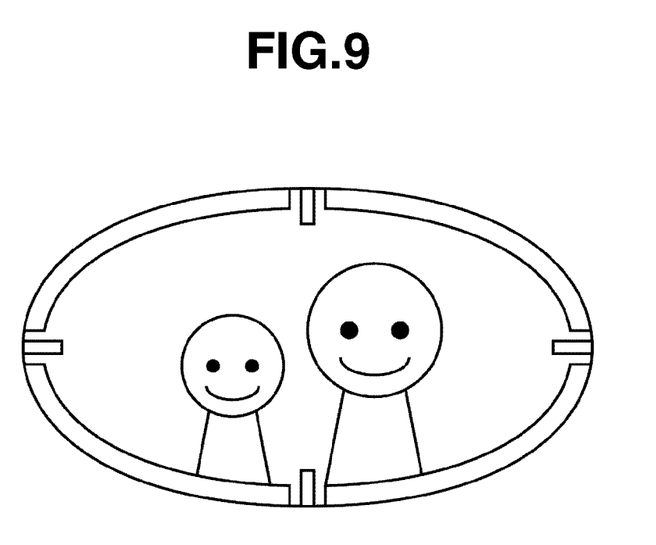
FIG. 9 illustrates the display screen according to the exemplary embodiment of the present invention.

FIG. 9 illustrates an example in which the present invention is applied in an oval effective display area. As illustrated in FIG. 9, progress display can be performed along edges of an oval effective display area and can indicate the progress situation in more detail without hiding the main subject.

In the present exemplary embodiment, a digital video camera is described as an example of the information processing apparatus according to the present invention. However, the present invention is not limited to such an example. The present invention may be applied as long as a progress situation of a predetermined process is to be displayed on a display apparatus. Further, an example is described in which the progress situation of the processing is displayed by indicating the passage of time. However, the present invention is not limited to using time, as long as the progress situation of the processing can be indicated. For example, the progress situation concerning an amount of processed data, a number of operation items and the like can also be displayed in the progress situation display area.

As described above, according to the present invention, progress can be displayed using only the periphery which avoids the middle of the effective display area where the main display elements tend to be placed. Especially, for an imaging apparatus or for a video reproduction apparatus, except for exceptional cases, the main subject is rarely placed on the periphery of the effective display area. Therefore, excluding such exceptional cases, progress can be displayed without hiding the main subject.

Further, according to the present invention, the progress situation can be indicated using the sum of the lengths of the sides of the effective display area. Moreover, in addition to the interval between indices, since the progress situation of 1/n of the whole processing is indicated by one side (interval between apexes), the apexes can be utilized as a scale for the progress situation of the processing. Thus, the ratio of the whole can be indicated more directly by utilizing the figurative characteristics. Therefore, compared with the conventional progress bar display, the progress situation can be indicated more clearly, and the ratio of progress can be indicated in more detail.

The processing in the above exemplary embodiment may also be provided to a system or an apparatus with a recording medium on which a software program code for realizing the functions of the exemplary embodiment is recorded. The functions of the above exemplary embodiment may be realized by having a computer (or a CPU or a micro processing unit (MPU)) of the system or apparatus read and execute the program code stored in the recording medium.

In this case, the program code itself read from the recording medium realizes the functions of the above exemplary embodiment, so that the recording medium on which the program code is recorded constitutes the present invention. Examples of recording media which can be used for supplying such a program code include a floppy disk, a hard disk, an optical disk, a magneto-optical disk, a compact disc read only memory (CD-ROM), a compact disc recordable (CD-R), a magnetic tape, a nonvolatile memory card, a ROM and the like.

Further, each of the functions of the above exemplary embodiment is not only realized by executing the program code read by the computer. The present invention also includes cases where, based on an instruction from the program code, an operating system (OS) or the like running on the computer performs a part or all of the actual processing, and by that processing the functions of the above-described exemplary embodiment can be realized.

Further, the present invention also includes cases where the program code read from the recording medium is written into a memory provided on a function expansion board inserted into the computer or a function expansion unit connected to the computer. Then, based on an instruction from the program code, a CPU or the like provided on the function expansion board or function expansion unit performs a part or all of the actual processing, and by that processing the functions of the above exemplary embodiment can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-001730 filed Jan. 7, 2009, which is hereby incorporated by reference herein in its entirety.

What is claimed is:

1. An information processing apparatus comprising:
a processing unit configured to execute a predetermined process;
an acquisition unit configured to acquire a progress situation of the predetermined process executed by the processing unit; and
a display control unit configured to display a progress situation display area for indicating the progress situation of the predetermined process on an area which lies along a plurality of adjacent sides of the display area on a display apparatus, and control a display state of the progress situation display area based on the progress situation acquired by the acquisition unit so that the display state changes from a state indicating that processing is yet to be performed to a state indicating that processing has been performed, progressively from one end to another end of the progress situation display area at a different rate based on a length of the sides along which the progress situation display area lies.

2. The information processing apparatus according to claim 1, wherein the display control unit is configured to perform control so that the progress situation display area is displayed along n sides of the display area, and control the rate at which the display state changes so that, in the progress situation display area, 1/n of the whole predetermined process is indicated as having progressed, by changing the area lying along one side of the n sides of the display area to a display state indicating that the processing has been performed.

3. The information processing apparatus according to claim 1, wherein the predetermined process is performed for a predetermined duration, the information processing apparatus further comprising a time measurement unit configured to measure time from when the predetermined process starts, wherein the acquisition unit is configured to acquire the duration measured by the time measurement unit, and wherein the display control unit performs control to change the display state based on the duration acquired by the acquisition unit so that when the duration acquired by the acquisition unit reaches a predetermined time, all areas of the progress situation display area are changed to the display state indicating processing has been performed.

4. The information processing apparatus according to claim 3, further comprising an imaging unit configured to capture a moving image, wherein the predetermined process is moving image capturing processing for the predetermined duration.

5. The information processing apparatus according to claim 4, wherein the display control unit is further configured to perform control so that the moving image being captured is displayed in the display area when the processing unit performs the moving image capturing processing for the predetermined duration.

6. The information processing apparatus according to claim 1, wherein the display control unit is further configured to perform control so that a plurality of indices which respectively indicate that predetermined ratios of the processing have been executed of the whole of the predetermined processing, is displayed at positions corresponding to respective midpoints of the sides of the display area.

7. The information processing apparatus according to claim 6, wherein the display control unit is further configured to perform control so that the display state of the plurality of indices is respectively changed based on the progress situation acquired by the acquisition unit reaching the respective predetermined ratios.

8. The information processing apparatus according to claim 1, wherein the display control unit is configured to perform control so that the progress situation display area is displayed along all sides of the display area.

9. A method for processing information comprising:
displaying a progress situation display area for indicating a progress situation of a predetermined process on an area which lies along a plurality of adjacent sides of a display area on a display apparatus;
executing the predetermined process;
acquiring the progress situation of the predetermined process; and
controlling a display state of the progress situation display area based on the acquired progress situation so that the display state changes from a state indicating that processing is yet to be performed to a state indicating that processing has been performed progressively from one end to another end of the progress situation display area at a different rate based on a length of the sides along which the progress situation display area lies.

10. A non-transitory computer-readable recording medium which records a program which makes a computer function as:
a processing unit configured to execute a predetermined process;
an acquisition unit configured to acquire a progress situation of the predetermined process executed by the processing unit; and
a display control unit configured to display a progress situation display area for indicating the progress situation of the predetermined process on an area which lies along a plurality of adjacent sides of the display area on a display apparatus, and control a display state of the progress situation display area based on the progress situation acquired by the acquisition unit so that the display state changes from a state indicating that processing is yet to be performed to a state indicating that processing has been performed progressively from one end to another end of the progress situation display area at a different rate based on a length of the sides along which the progress situation display area lies.

11. An information processing apparatus comprising:
a processing unit configured to execute a predetermined process;
an acquisition unit configured to acquire a progress situation of the predetermined process executed by the processing unit; and
a display control unit configured to display a progress situation display area for indicating the progress situation of the predetermined process on an area which lies along n pieces of adjacent sides of the display area on a display apparatus, and control a display state of the progress situation display area based on the progress situation acquired by the acquisition unit so that the display state changes from a state indicating that processing is yet to be performed to a state indicating that processing has been performed progressively from one end to another end of the progress situation display area,
wherein the display control unit is configured to perform control so that, in the progress situation display area, the display state is changed to indicate that 1/n of the whole predetermined process has progressed, by changing the area lying along one side of the n sides of the display area to a display state indicating that the processing has been performed, where n is greater than one.

12. A method for processing information comprising:
displaying a progress situation display area for indicating a progress situation of a predetermined process on an area which lies along n pieces of adjacent sides of a display area on a display apparatus;
executing the predetermined process;
acquiring the progress situation of the predetermined process;
controlling a display state of the progress situation display area based on the acquired progress situation so that the display state changes from a state indicating that processing is yet to be performed to a state indicating that processing has been performed progressively from one end to another end of the progress situation display area; and
performing control so that, in the progress situation display area, the display state is changed to indicate that 1/n of the whole predetermined process has progressed, by changing the area lying along one side of the n sides of the display area to a display state indicating that the processing has been performed, where n is greater than one.

13. A non-transitory computer-readable recording medium which records a program which makes a computer function as:
a processing unit configured to execute a predetermined process;
an acquisition unit configured to acquire a progress situation of the predetermined process executed by the processing unit; and
a display control unit configured to display a progress situation display area for indicating the progress situation of the predetermined process on an area which lies along n pieces of adjacent sides of the display area on a display apparatus, and control a display state of the progress situation display area based on the progress situation acquired by the acquisition unit so that the display state changes from a display state indicating that processing is yet to be performed to a state indicating that processing has been performed progressively from one end to another end of the progress situation display area, wherein the display control unit is configured to perform control so that, in the progress situation display area, the display state is changed to indicate that 1/n of the whole predetermined process has progressed, by changing the area lying along one side of the n sides of the display area to a display state indicating that the processing has been performed, where n is greater than one.

* * * * *